US012287050B2

(12) United States Patent
Piontek et al.

(10) Patent No.: US 12,287,050 B2
(45) Date of Patent: Apr. 29, 2025

(54) ENCAPSULATION SLEEVE GASKET ASSEMBLY WITH REMOVABLE INNER LAYER

(71) Applicant: Total Piping Solutions, Inc., Olean, NY (US)

(72) Inventors: Daryl M. Piontek, Great Valley, NY (US); Richard Fontes, Olean, NY (US)

(73) Assignee: Dresser Water, LLC, Houston, TX (US)

( * ) Notice: Subject to any disclaimer, the term of this patent is extended or adjusted under 35 U.S.C. 154(b) by 324 days.

(21) Appl. No.: 15/829,645

(22) Filed: Dec. 1, 2017

(65) Prior Publication Data

US 2018/0156367 A1    Jun. 7, 2018

Related U.S. Application Data

(60) Provisional application No. 62/429,611, filed on Dec. 2, 2016.

(51) Int. Cl.
*F16L 21/08* (2006.01)
*F16L 17/025* (2006.01)
(Continued)

(52) U.S. Cl.
CPC ............. *F16L 21/08* (2013.01); *F16L 17/025* (2013.01); *F16L 17/04* (2013.01); *F16L 21/06* (2013.01);
(Continued)

(58) Field of Classification Search
CPC ..... F16L 19/0218; F16L 21/08; F16L 23/024; F16L 37/101; F16L 37/124; F16L 55/172;
(Continued)

(56) References Cited

U.S. PATENT DOCUMENTS 2,421,659 A * 6/1947 Sutton .................. F16L 17/073
277/612
2,517,290 A   1/1950 De Moude et al.
(Continued)

FOREIGN PATENT DOCUMENTS

EP    2990711 A1   3/2016
WO   9533948 A1   12/1995
(Continued)

OTHER PUBLICATIONS

KIPO, International Search Report and Written Opinion of the ISA/KR from corresponding PCT Application No. PCT/US2017/064289 Mar. 14, 2018.
(Continued)

*Primary Examiner* — William S. Choi
(74) *Attorney, Agent, or Firm* — Harter Secrest & Emery LLP

(57) ABSTRACT

A coupling assembly orientated about a longitudinal axis and having a first sleeve and second sleeve configured to be tightened to a fluid conduit, a radial-split gasket configured to be positioned between the sleeves and the fluid conduit and having an outer gasket layer and a separate inner gasket layer that are configured to be selectively disengaged from each other, and an inner circumferential surface of the outer gasket layer and/or an outer circumferential surface of the inner gasket layer comprising a plurality of circumferentially spaced retaining protrusions interfacing between the inner and outer gasket layers to maintain angular alignment of the inner and outer gasket layers about the longitudinal axis.

16 Claims, 16 Drawing Sheets

(51) Int. Cl.
*F16L 17/04* (2006.01)
*F16L 21/06* (2006.01)
*F16L 23/024* (2006.01)
*F16L 25/12* (2006.01)
*F16L 37/10* (2006.01)
*F16L 37/124* (2006.01)

(52) U.S. Cl.
CPC ........... *F16L 21/065* (2013.01); *F16L 23/024* (2013.01); *F16L 37/101* (2013.01); *F16L 37/124* (2013.01); *F16L 25/12* (2013.01)

(58) Field of Classification Search
CPC ....... F16L 25/12; F16L 55/175; F16L 21/065; F16L 17/025; F16L 17/03; F16L 17/035; F16L 17/04; F16L 17/073; F16L 17/08; F16L 19/06; F16L 19/12; F16L 21/02; F16L 21/025; F16L 21/06; F16L 27/1133; F16L 23/16; F16L 5/02; F16L 25/0054; F16L 33/18; F16J 15/02; F16J 15/025; F16J 15/022; F16J 15/10; F16J 15/12; F16J 15/067; F16J 15/104
USPC ....... 285/367, 15, 16, 66, 65, 110, 111, 417, 285/419, 910, 373, 236, 421, 337, 379, 285/364; 277/602, 603, 604, 607, 608, 277/609, 612, 626, 631, 372, 445, 578, 277/579, 580, 581, 582
See application file for complete search history.

(56) References Cited

U.S. PATENT DOCUMENTS

| | | | |
|---|---|---|---|
| 2,761,709 A * | 9/1956 | Gilbert, Sr. | |
| 3,150,876 A * | 9/1964 | Lafferty | F16L 17/025 277/603 |
| 4,391,458 A | 7/1983 | Blakeley | |
| 4,580,788 A * | 4/1986 | Rabe | |
| 4,905,533 A * | 3/1990 | Benton | |
| 5,203,594 A | 4/1993 | Straub | |
| 5,722,294 A | 3/1998 | Kobayashi | |
| 6,070,914 A | 6/2000 | Schmidt | |
| 6,168,210 B1 | 1/2001 | Bird | |
| 6,293,556 B1 | 9/2001 | Krausz | |
| 7,390,026 B2 * | 6/2008 | Noda | F16L 17/04 |
| 7,527,306 B2 | 5/2009 | Ben-Horin | |
| 8,096,585 B2 | 1/2012 | Vitel | |
| 8,096,586 B2 | 1/2012 | Vitel | |
| 8,528,945 B2 * | 9/2013 | Bird | |
| 8,776,351 B2 | 7/2014 | Bird et al. | |
| 8,894,100 B2 * | 11/2014 | Eaton | F16L 21/08 |
| 8,967,422 B2 * | 3/2015 | Volkmann | |
| 9,310,002 B2 * | 4/2016 | Chiproot | F16J 15/025 |
| 2004/0036233 A1 | 2/2004 | Schleth | |
| 2005/0225089 A1 | 10/2005 | Ben-Horin | |
| 2005/0230972 A1 | 10/2005 | Owen et al. | |
| 2006/0061090 A1 | 3/2006 | Krausz et al. | |
| 2010/0237614 A1 | 9/2010 | Howard et al. | |
| 2010/0327576 A1 | 12/2010 | Linhorst | |
| 2012/0192963 A1 | 8/2012 | Minich et al. | |
| 2012/0205909 A1 | 8/2012 | Bird | |
| 2013/0119658 A1 | 5/2013 | Bird et al. | |
| 2014/0001709 A1 | 1/2014 | Chiproot et al. | |
| 2014/0299533 A1 | 10/2014 | Elwell et al. | |
| 2018/0156367 A1 | 6/2018 | Piontek et al. | |

FOREIGN PATENT DOCUMENTS

| | | |
|---|---|---|
| WO | 2008019790 A1 | 2/2008 |
| WO | 2015145377 A1 | 10/2015 |

OTHER PUBLICATIONS

US Patent and Trademark Office, International Search Report and Written Opinion of the ISA/US from PCT Appl. No. PCT/US2020/16111, dated Apr. 9, 2019.

European Patent Office, Extended European Search Report (EESR) from corresponding European Application No. 17876732.3, issued Nov. 2, 2020.

* cited by examiner

ENCAPSULATION SLEEVE GASKET ASSEMBLY WITH REMOVABLE INNER LAYER

TECHNICAL FIELD

The present invention relates generally to the field of fluid conduit repair and coupling sleeves, and more particularly to an improved pipe coupling sleeve and gasket assembly.

BACKGROUND ART

Split repair and encapsulating sleeves or clamps are used in the repair or reinforcement of pipes. For example, conventional assemblies for coupling and sealing adjacent ends of two adjacent pipe sections include a sleeve, shell or collar with each pipe end extending into a respective end of the sleeve. Gaskets are placed between the sleeve and each pipe end, respectively, such that tightening the sleeve to the pipe sections compresses the gasket against the pipe ends, thereby sealing the pipe coupling to the pipes.

Some split ring type pipe couplings utilize a gasket having a plurality of layers integrally connected to each other. The inner layer typically defines an opening adapted to receive small diameter pipe ends and, when it is desired to couple a larger diameter pipe end than cannot fit through the inner layer opening, one or more of the layers may be manually removed from the gasket to increase the size of the gasket opening to accommodate the larger diameter pipe.

U.S. Pat. No. 6,168,210, entitled "Pipe Coupling," discloses a sleeve, flanges and gaskets that are coupled together via bolts to compress the gaskets against pipe ends as the flanges are drawn towards each other. U.S. Pat. No 4,391,458, entitled "Pipe Coupling With Gasket Locating Means," discloses a pipe coupling having a split housing surrounding a split-ring gasket.

U.S. Patent Application Publication No. 2010/0327576, entitled "Pipe Coupler and Gasket With Positive Retention and Sealing Capability," discloses a coupler which provides positive retention of a gasket about the circumference of the coupler. U.S. Pat. No. 8,776,351, entitled "Split-Ring Gland Pipe Coupling With Corrugated Armor," discloses a pipe coupling for coupling adjacent ends of a pair of pipes that includes a sleeve, a split-ring gland positioned around one of the ends of the sleeve, and an annular gasket positioned within the split-ring gland and configured to be compressed by the split-ring gland for sealing one pipe end to the sleeve.

BRIEF SUMMARY OF THE INVENTION

With parenthetical reference to corresponding parts, portions or surfaces of the disclosed embodiment, merely for the purposes of illustration and not by way of limitation, an improved conduit coupling assembly (115) configured to clamp to a fluid conduit (19, 119) oriented about a longitudinal axis (x-x) is provided comprising: a first arcuate sleeve member (16A); a second arcuate sleeve member (16B); a connecting assembly (18, 28A, 28B) coupling the first sleeve member to the second sleeve member and configured to tighten the first and second sleeve members to a fluid conduit from a non-actuated position to a tightened position; an arcuate radial-split gasket (125A, 125B) configured to be positioned between the first and second sleeve members and the fluid conduit; the gasket comprising a radial-split arcuate outer gasket layer (140) and a separate radial-split arcuate inner gasket layer (130); the outer gasket layer having an inner circumferential surface (142, 146, 150) and an outer circumferential surface (152, 156); the inner gasket layer having an inner circumferential surface (132) and an outer circumferential surface (134A, 134B, 134C); the inner and outer gasket layers configured to be selectively disengaged from each other; and the inner circumferential surface of the outer gasket layer and/or the outer circumferential surface of the inner gasket layer comprising a plurality of circumferentially spaced retaining protrusions (161A, 161B, 161C) interfacing between the inner and outer gasket layers to maintain angular alignment (166A, 166B, 166C) of the inner and outer gasket layers about the longitudinal axis.

The outer circumferential surface of the inner gasket layer may comprise a plurality of radially protruding circumferentially spaced spokes (161A, 161B, 161C) interfacing with the outer gasket layer to maintain the angular alignment of the inner and outer gasket layers about the longitudinal axis. The inner circumferential surface of the outer gasket layer may comprise a plurality of circumferentially spaced cavities (162A, 162B, 162C) configured to receive the protruding circumferentially spaced spokes of the inner gasket layer to maintain the angular alignment of the outer gasket layer and the inner gasket layer about the longitudinal axis. The circumferentially spaced spokes of the inner gasket layer and the circumferentially spaced cavities of the outer gasket layer may be correspondingly located about the longitudinally extending axis and in mating engagement to maintain the angular alignment of the inner and outer gasket layers about the longitudinal axis such that the radial-split (126B) of the outer gasket layer and the radial split (126A) of the inner gasket layer are aligned on a common radius (165) about the longitudinal axis.

The outer circumferential surface of the outer gasket layer may comprise an inwardly extending circumferential groove (160) therein. The annular groove may have a circumferential arc length about the longitudinal axis substantially less than the outer circumferential surface of the outer gasket layer about the longitudinal axis. The outer gasket layer may have a maximum axial width (127B) and the inner gasket layer may have a maximum axial width (127A) less than the maximum axial width of the outer gasket layer.

The inner circumferential surface of the outer gasket layer may comprise a plurality of inwardly extending circumferential channels (157A, 157B) therein; the outer circumferential surface of the inner gasket layer may comprise a plurality of outwardly extending circumferential splines (139A, 139B); and the circumferential channels of the outer gasket layer may be configured to receive the circumferential splines of the inner gasket layer.

In another aspect, a conduit coupling assembly (15) configured to clamp to a fluid conduit oriented about a longitudinal axis is provided comprising: a first arcuate sleeve member; a second arcuate sleeve member; a connecting assembly coupling the first sleeve member to the second sleeve member and configured to tighten the first and second sleeve members to a fluid conduit from a non-actuated position to a tightened position; a gasket ring (25) configured to be positioned around a fluid conduit between the first and second sleeve members and the fluid conduit; the gasket comprising an outer gasket ring (40) and a separate inner gasket ring (30); the outer gasket ring having an inner annular surface (42, 46, 50) and an outer annular surface (52); the inner gasket ring having an inner annular surface (32) and an outer annular surface (36); the inner and outer gasket rings configured to be selectively disengaged from each other; and the outer gasket ring having a maximum axial width (27B) and the inner gasket ring having a maximum axial width (27A) less than the maximum axial width of the outer gasket ring.

The outer circumferential surface of the outer gasket ring may comprise an inwardly extending circumferential groove therein. The inner circumferential surface of the outer gasket ring may comprise a plurality of inwardly extending circumferential channels (57A, 57B) therein; the outer circumferential surface of the inner gasket ring may comprise a plurality of outwardly extending circumferential splines (39A, 39B); and the circumferential channels of the outer gasket ring may be configured to receive the circumferential splines of the inner gasket ring.

In another aspect, a gasket (125, 125A) configured to clamp to a fluid conduit oriented about a longitudinal axis is provided comprising: a radial-split arcuate outer gasket layer (140) and a separate radial-split arcuate inner gasket layer (130); the outer gasket layer having an inner circumferential surface (142, 146, 150) and an outer circumferential surface (152, 156); the inner gasket layer having an inner circumferential surface (132) and an outer circumferential surface (134A, 134B, 134C); the inner and outer gasket layers configured to be selectively disengaged from each other; and the inner circumferential surface of the outer gasket layer and/or the outer circumferential surface of the inner gasket layer comprising a plurality of circumferentially spaced retaining protrusions (161A, 161B, 161C) interfacing between the inner and outer gasket layers to maintain angular alignment of the inner and outer gasket layers about the longitudinal axis.

The outer circumferential surface of the inner gasket layer may comprise a plurality of radially protruding circumferentially spaced spokes (161A, 161B, 161C) interfacing with the outer gasket layer to maintain the angular alignment of the inner and outer gasket layers about the longitudinal axis. The inner circumferential surface of the outer gasket layer may comprise a plurality of circumferentially spaced cavities (162A, 162B, 162C) configured to receive the protruding circumferentially spaced spokes of the inner gasket layer to maintain the angular alignment of the outer gasket layer and the inner gasket layer about the longitudinal axis. The circumferentially spaced spokes of the inner gasket layer and the circumferentially spaced cavities of the outer gasket layer may be correspondingly located about the longitudinally extending axis and in mating engagement to maintain the angular alignment of the inner and outer gasket layers about the longitudinal axis such that the radial-split (126B) of the outer gasket layer and the radial split (126A) of the inner gasket layer are aligned on a common radius (165) about the longitudinal axis.

The outer circumferential surface of the outer gasket layer may comprise an inwardly extending circumferential groove (16) therein. The circumferential groove may have a circumferential arc length about the longitudinal axis substantially less than the outer circumferential surface of the outer gasket layer about the longitudinal axis. The outer gasket layer may have a maximum axial width (27B) and the inner gasket layer may have a maximum axial width (27A) less than the maximum axial width of the outer gasket layer.

The inner circumferential surface of the outer gasket layer may comprise a plurality of inwardly extending circumferential channels (157A, 157B) therein; the outer circumferential surface of the inner gasket layer may comprise a plurality of outwardly extending circumferential splines (139A, 139B); and the circumferential channels of the outer gasket layer may be configured to receive the circumferential splines of the inner gasket layer.

DETAILED DESCRIPTION OF THE EMBODIMENTS

Figure 1:
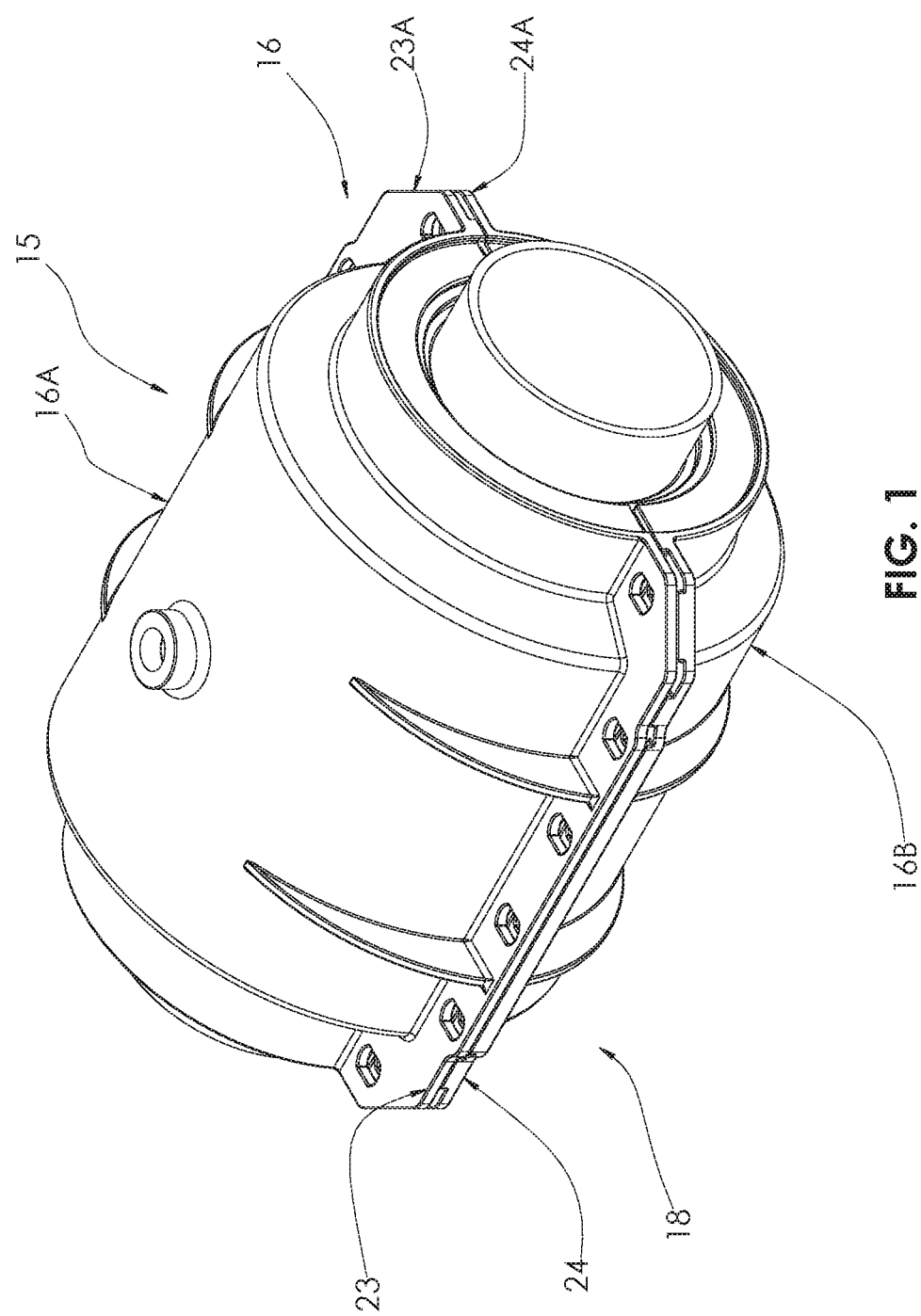
FIG. 1 is a perspective view of an embodiment of the improved assembly.

At the outset, it should be clearly understood that like reference numerals are intended to identify the same structural elements, portions or surfaces consistently throughout the several drawing figures, as such elements, portions or surfaces may be further described or explained by the entire written specification, of which this detailed description is an integral part. Unless otherwise indicated, the drawings are intended to be read (e.g., cross-hatching, arrangement of parts, proportion, degree, etc.) together with the specification, and are to be considered a portion of the entire written description of this invention. As used in the following description, the terms "horizontal", "vertical", "left", "right", "up" and "down", as well as adjectival and adverbial derivatives thereof (e.g., "horizontally", "rightwardly", "upwardly", etc.), simply refer to the orientation of the illustrated structure as the particular drawing figure faces the reader. Similarly, the terms "inwardly" and "outwardly" generally refer to the orientation of a surface relative to its axis of elongation, or axis of rotation, as appropriate.

Figure 2:
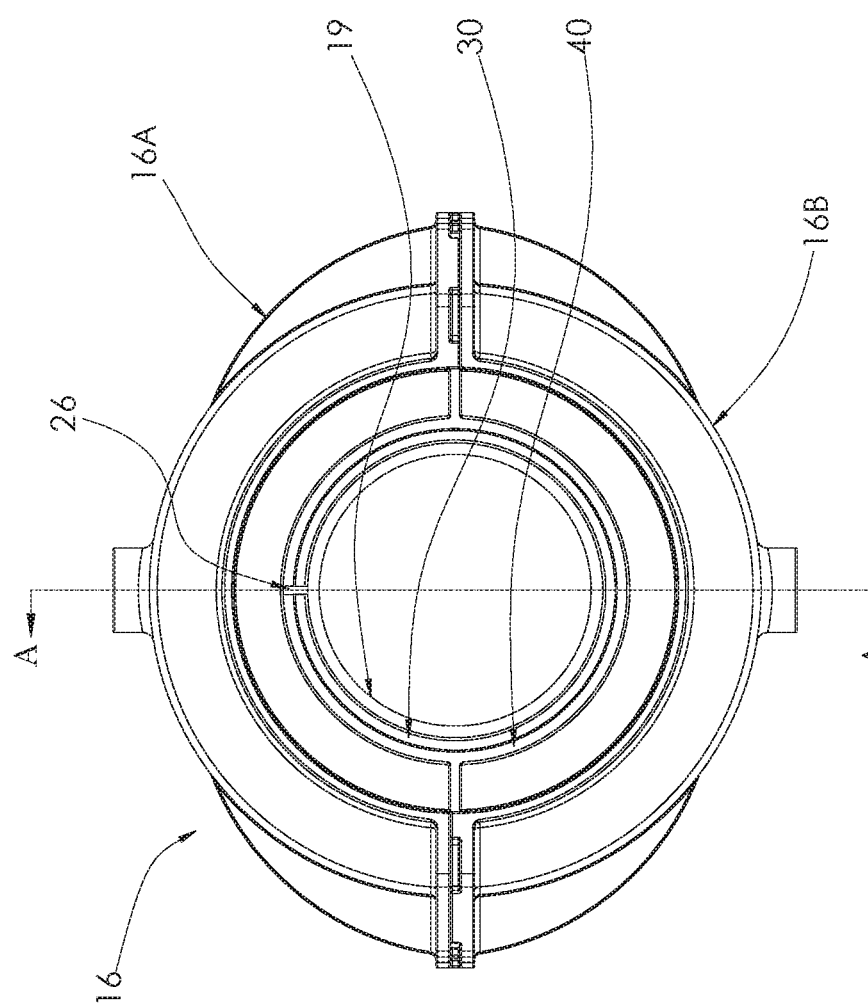
FIG. 2 is an end view of the assembly shown in FIG. 1.
Figure 3:
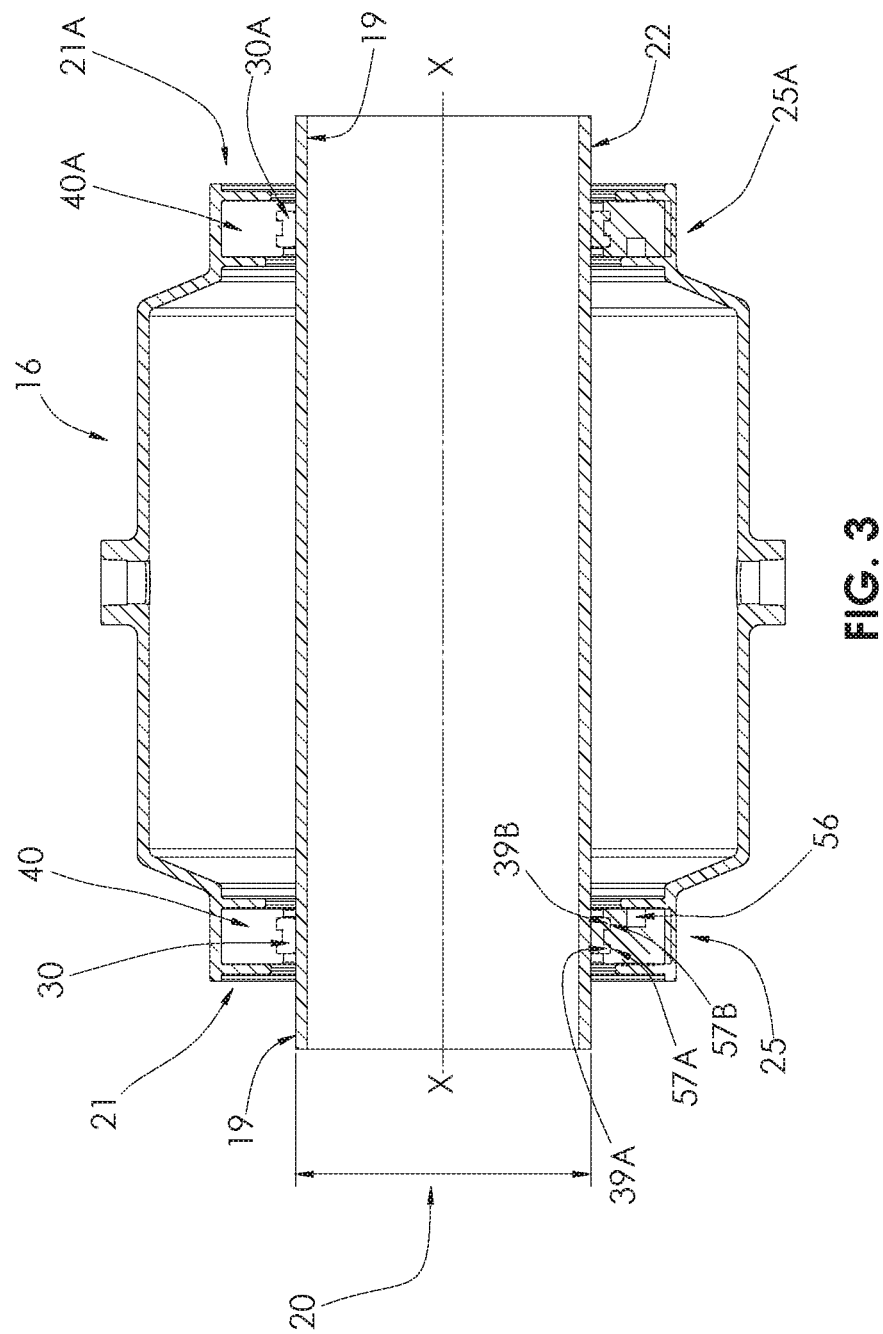
FIG. 3 is a longitudinal vertical cross-sectional view of the assembly shown in FIG. 2, taken generally on line A-A of FIG. 2.

Referring now to the drawings, and more particularly to FIGS. 1-3 thereof, an improved pipe coupling assembly is provided, of which a first embodiment is generally indicated at 15. As shown, assembly 15 generally comprises outer encapsulation sleeve or shell 16 and two end gaskets 25 and 25A, which surround pipe 19 having outer pipe diameter 20. Shell 16, gaskets 25 and 25A and pipe 19 are all generally ring-like cylindrical structures orientated about axis x-x. In operation, sleeve 16 is circumferentially disposed on the outside of pipe 19.

Sleeve 16 includes semi-cylindrical top half shell 16A and semi-cylindrical lower half shell 16B, which are bolted together via tightening assembly 18 to encapsulate pipe 19. Top half shell 16A and bottom half shell 16B are thereby connected and tightened around pipe 19 via bolts, severally indicated at 28A, and nuts, severally indicated at 28B. End gaskets 25 and 25A are configured to wrap around and encircle pipe 19 between outer surface 22 of pipe 19 and specially configured inner pockets 21 and 21A of the two halves 16A and 16B, respectively, of encapsulating sleeve 16 to form a seal, with end gaskets 25A and 25BA sealing on pipe 19 having outer diameter 20. Sleeve 16 is thereby configured and arranged to be tightened around pipe 19 and has two pairs of longitudinally extending opposed flange edges 23, 23A and 24, 24A that are drawn towards each other to seal pipe 16.

End gaskets 25 and 25A have specially contoured features and are disposed generally between the inner surfaces of sleeve 16 and outer cylindrical surface 22 of pipe 16. Thus, end gaskets 25 and 25A are sandwiched between the inside semi-cylindrical surfaces of sleeve 16 and outside cylindrical surface 22 of conduit 19 to provide sufficient sealing force to prevent leakage of fluid. Elastic or sealing energy is imparted into assembly 15 by tightening sleeve 16 from a loosened or a non-actuated position to a tightened sealed position.

As shown in FIGS. 1-7, each of end gaskets 25 and 25A comprises two nested gasket split-ring layers 30, 40 that can be separated from each other. Each end gasket 25 and 25A comprises outer gasket split-ring 40 and removable inner gasket split-ring 30. Inner split-ring or layer 30 may be removed from outer split-ring or layer 40. Cross-section views and enlarged cross-sectional views of the nesting arrangement between outer split-ring 40 and inner split-ring 30 are shown in FIGS. 3-7.

Figure 7:
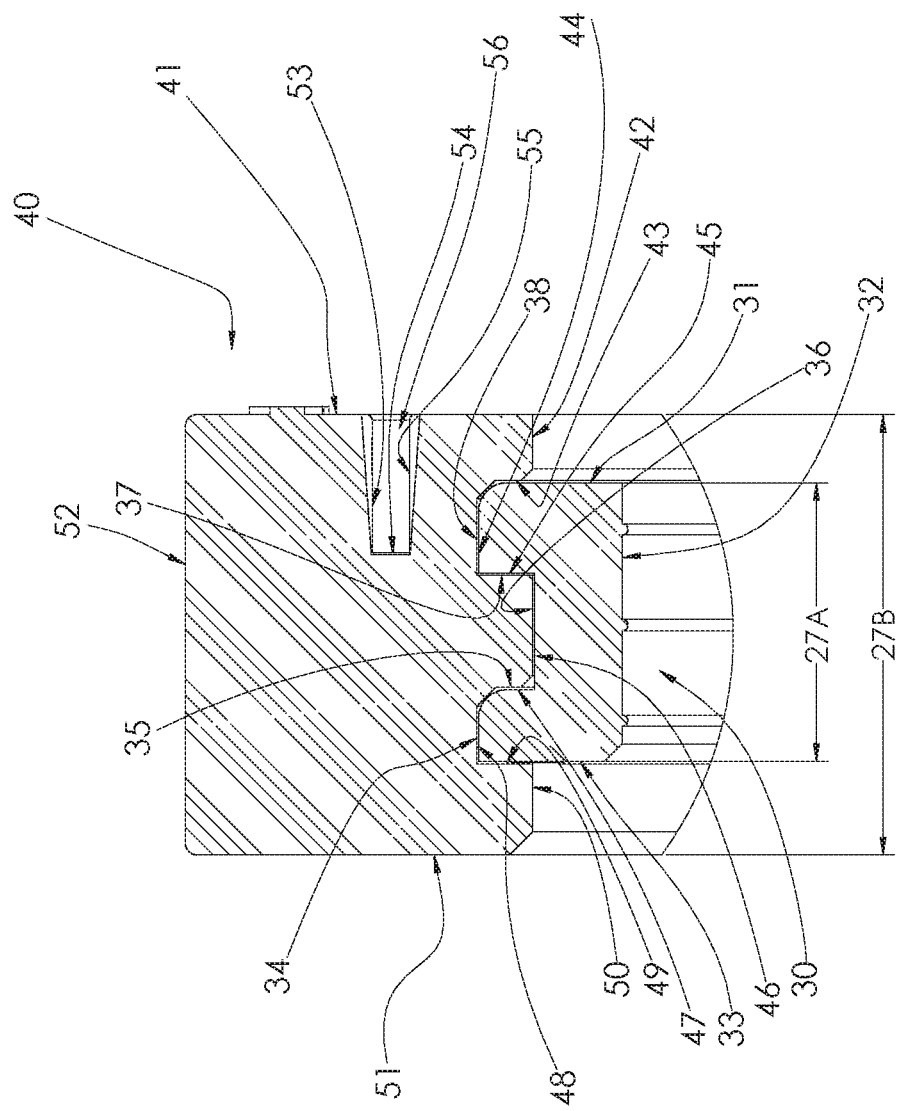
FIG. 7 is an enlarged longitudinal vertical cross-sectional view of the end gasket shown in FIG. 6, taken generally within the indicated circle C of FIG. 6.
Figure 6:
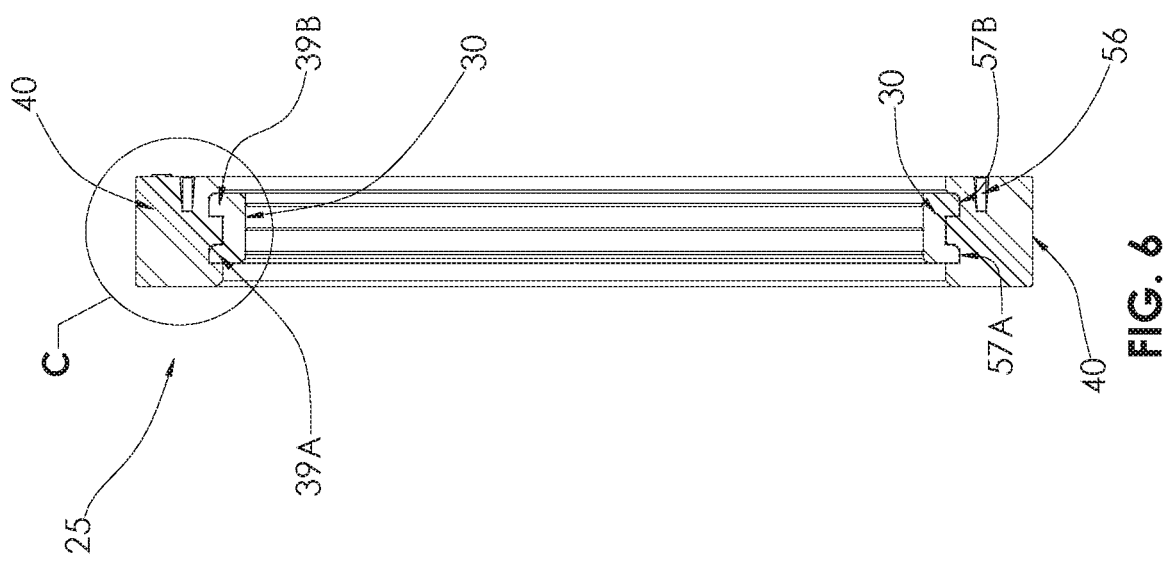
FIG. 6 is an alternative longitudinal vertical cross-sectional view of a nested end gasket.

As shown in FIG. 7, outer split ring gasket 40 is a specially-configured ring-shaped solid penannular member elongated along axis x-x, and is generally bounded by rightwardly-facing vertical annular surface 41, inwardly-facing horizontal cylindrical surface 42, leftwardly-facing vertical annular surface 43, inwardly-facing horizontal cylindrical surface 44, rightwardly-facing vertical annular surface 45, inwardly-facing horizontal cylindrical surface 46, leftwardly-facing vertical annular surface 47, inwardly-facing horizontal cylindrical surface 48, rightwardly-facing vertical annular surface 49, inwardly-facing horizontal cylindrical surface 50, leftwardly-facing vertical annular surface 51, and outwardly-facing horizontal cylindrical surface 52, joined at its right marginal end to the outer marginal end of surface 41.

As shown, surface 41 includes annular pressure assist cavity 56 defined by inwardly-facing horizontal cylindrical surface 53, rightwardly-facing concave curved annular surface 54, and outwardly-facing horizontal cylindrical surface 55, with surface 55 joined at its right marginal end to the surface 41 and surface 53 joined at its right marginal end to surface 41. Surfaces 47, 48 and 49 define first annular channel 57A in the inner circumference surfaces 42 and 50 of outer gasket 40, and surfaces 43, 44 and 45 define second annular channel 57B in the inner circumference surfaces 42 and 50 of outer gasket 40.

As shown in FIG. 7, inner split ring gasket 30 is a specially-configured ring-shaped solid penannular member elongated along axis x-x, and is generally bounded by rightwardly-facing vertical annular surface 31, inwardly-facing horizontal cylindrical surface 32, leftwardly-facing vertical annular surface 33, outwardly-facing horizontal cylindrical surface 34, rightwardly-facing vertical annular surface 35, outwardly-facing horizontal cylindrical surface 36, leftwardly-facing vertical annular surface 37, and outwardly-facing horizontal cylindrical surface 38, joined at its right marginal end to the outer marginal end of surface 31. The outer portion of surface 49 and surfaces 34 and 35 define spline 39A extending outwardly from outer circumferential surface 36 of inner gasket 30, and surfaces 36 and 37 and the outer portion of surface 38 define spline 39B extending outwardly from outer circumferential surface 36 of inner gasket 30. Splines 39A and 39B of inner gasket 30 are orientated in a plane substantially perpendicular to axis x-x and mate with channels 57A and 57B of outer gasket 40, respectively. As shown, inner gasket layer 30 has axial width 27A between side surfaces 31 and 33 that is less than axial width 27B between side surfaces 41 and 51 of outer gasket layer 40.

Figure 8:
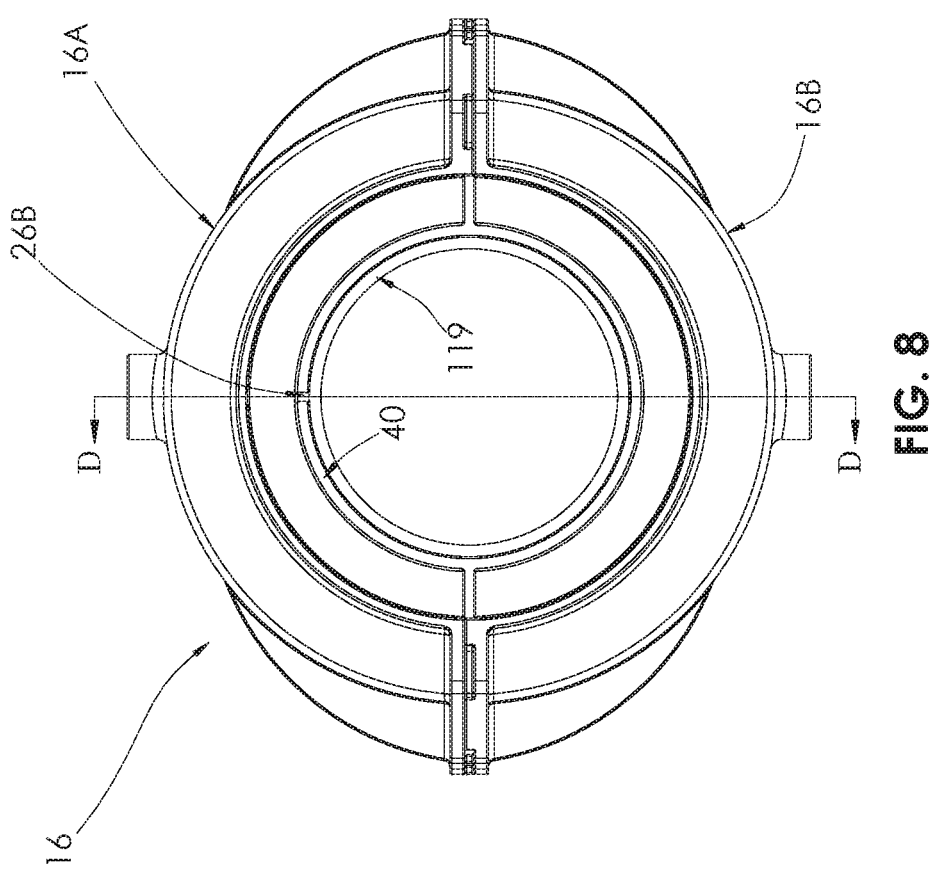
FIG. 8 is an end view of the assembly shown in FIG. 1 installed on an oversized diameter pipe.
Figure 9:
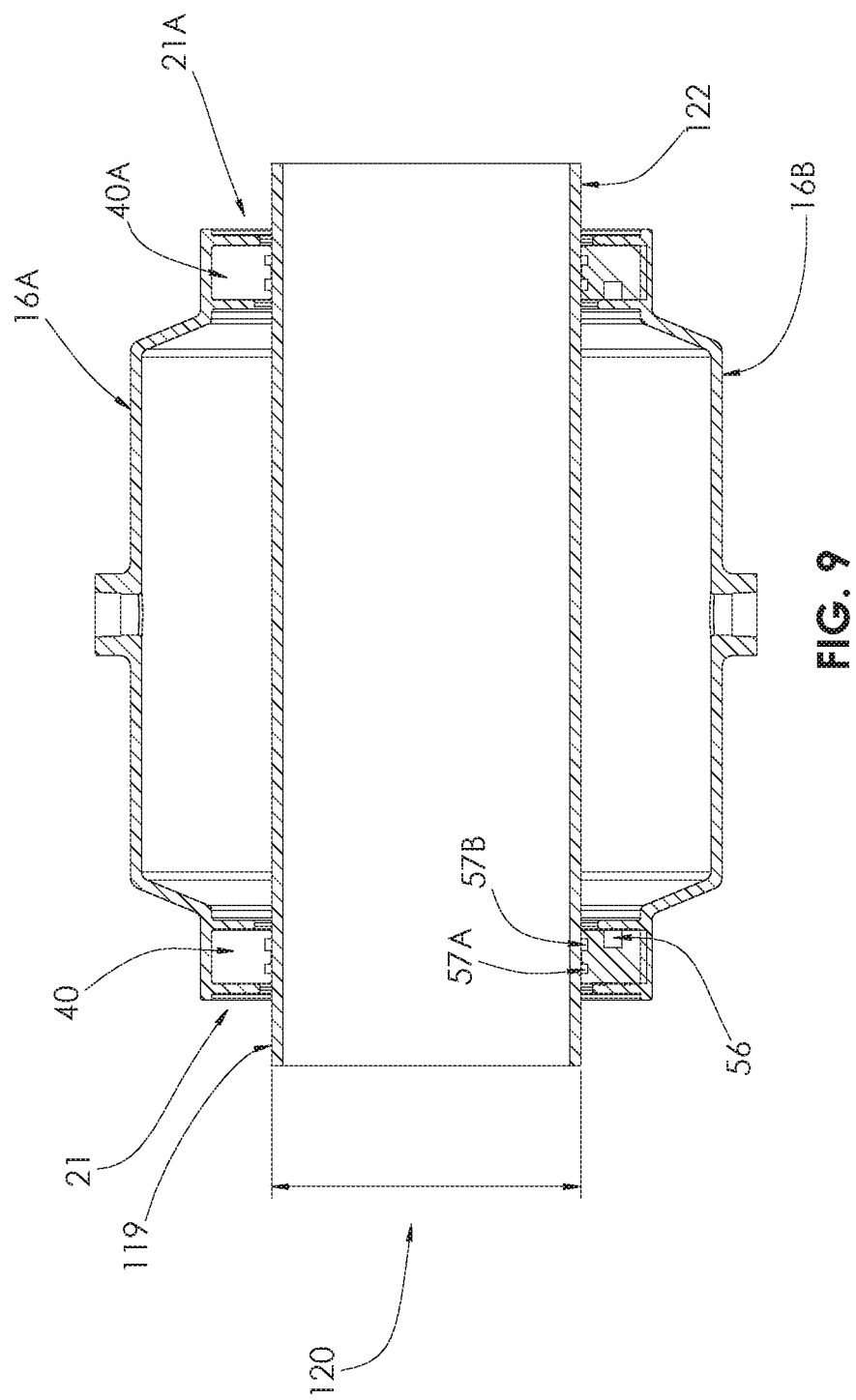
FIG. 9 is a longitudinal vertical cross-sectional view of the assembly shown in FIG. 8, taken generally on line D-D of FIG. 8.
Figure 10:
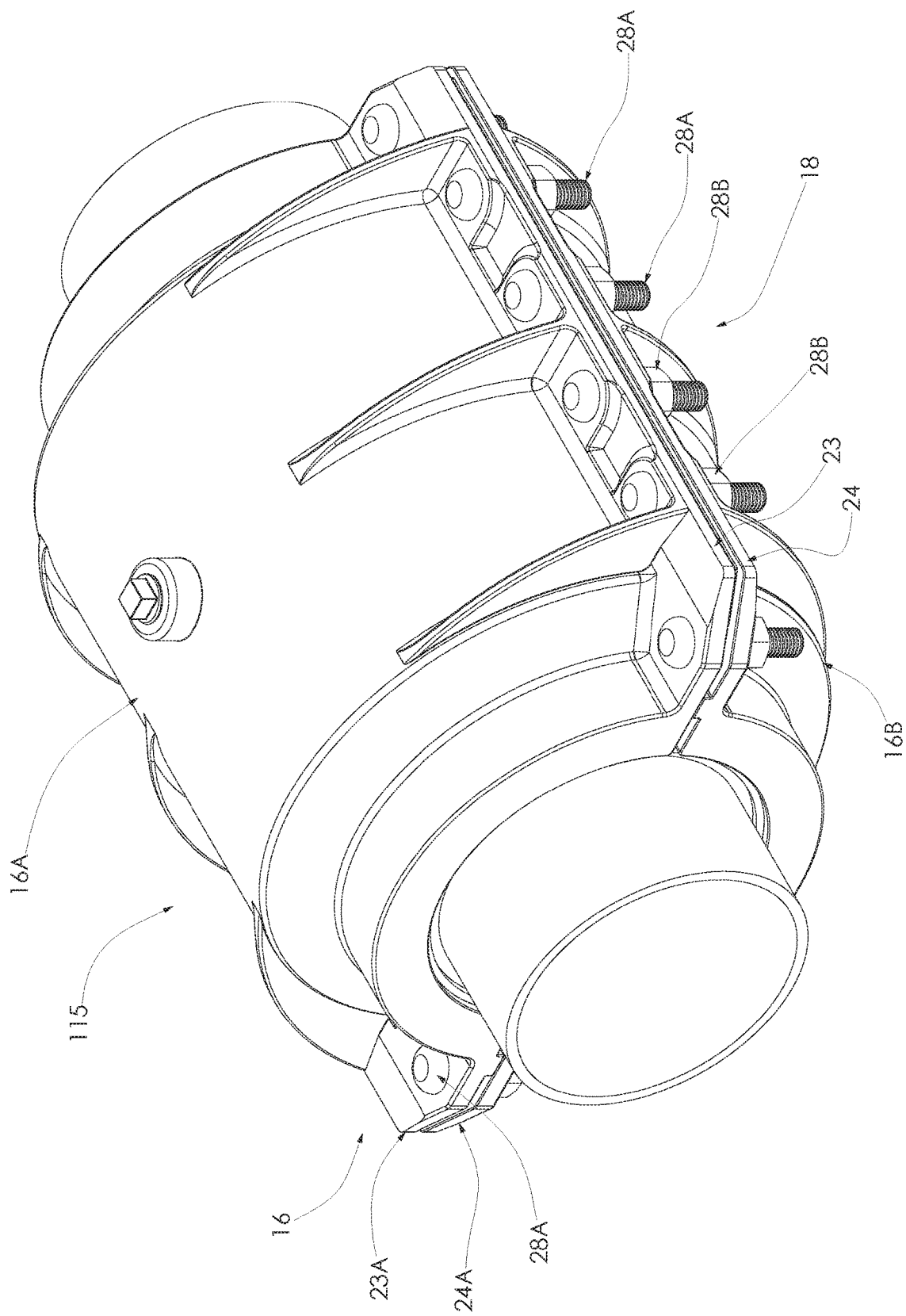
FIG. 10 is a perspective view of a second embodiment of the improved assembly.
Figure 11:
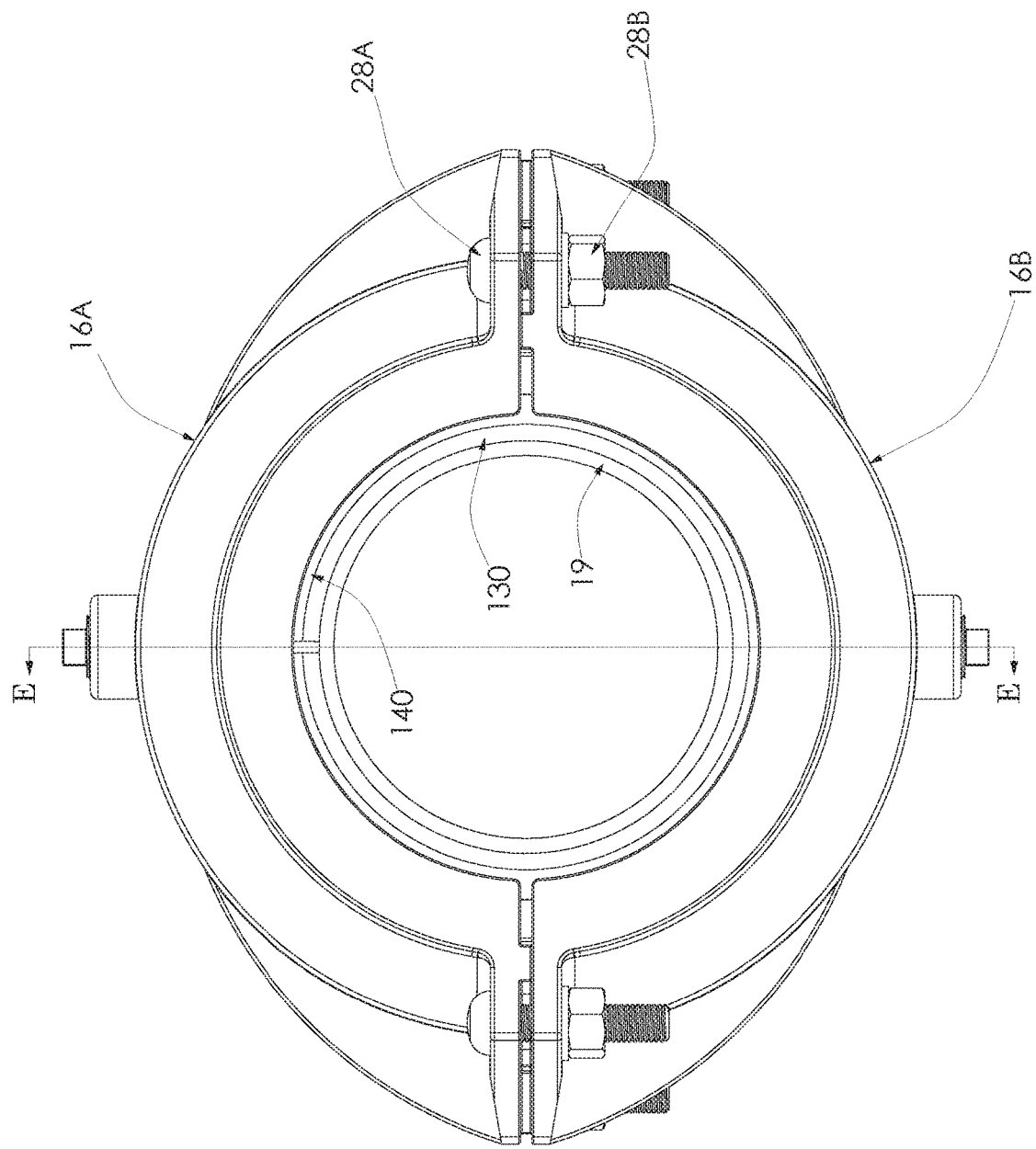
FIG. 11 is an end view of the assembly shown in FIG. 10.

As shown, inner split-ring 30 does not entirely overlap outer split-ring 40. Inner split-ring 30 has outer axial width 27A along axis x-x and outer split ring 40 has outer axial width 27B along axis x-x greater than axial width 27A of inner split ring 30. Right and left edges 31 and 33 of inner split-ring 30 are significantly inward of right and left edges 41 and 51, respectively, of outer split-ring 40. Inner gasket split-ring 30 is manually removable from outer gasket split-ring 40 to allow end gaskets 25 and 25A to be installed on oversize pipe 119 having outer diameter 120, as shown in FIGS. 8 and 9.

Split-ring end gaskets 25 and 25A are formed of a resilient material and are cut radially so as to be penannular and not form a full ring. Thus, instead of being a full continuous annular ring, radial break or gap 26 is provided through each layer 30 and 40 at a circumferential location. Thus, each layer 30 and 40 has a radial split 26A and 26B, respectively, through the entire gasket cross-section. The edges of gap 26 may thereby be manually separated or pulled apart from each other to form a more open C-shaped member. This gap is increased such that it is greater than outer diameter 20 of pipe 19 such that end gasket 25 and 25A can be installed on or fit around outer diameter 20 of pipe 19. Once installed on pipe 19, the opposed ends of the split-rings 30 and 40 will move back towards each other and gap 26 will close up.

Inner split-ring 30 and outer split-ring 40 are loosely connected to each other via annular splines 39A and 39B of inner gasket 30 being nested in annular channels 57A and 57B, respectively, such that inner split-ring 30 is adapted to be removed from outer split-ring 40 at a predetermined location. This allows end gasket 25 to be used with pipes of substantially different diameters. Thus, for pipe 19 having smaller outer diameter 20, inner and outer split-rings 30 and 40 are nested and used together, as shown in FIGS. 1-5. For pipes 119 of greater outer diameter 120, inner split-ring 30 is manually separated from outer split-ring 40 and just outer split-ring 40 is used as the end gasket, as shown in FIGS. 8 and 9.

Figure 5:
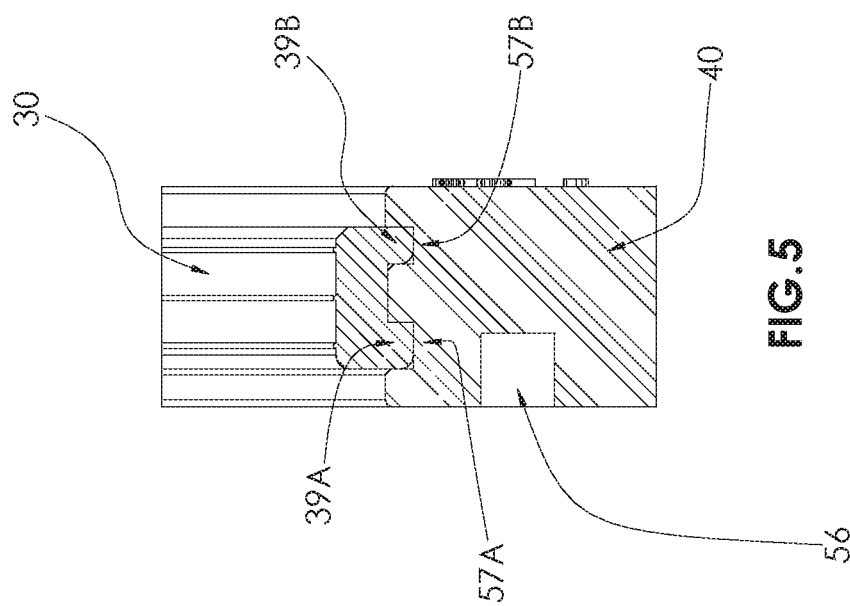
FIG. 5 is an enlarged longitudinal vertical cross-sectional view of the end gasket shown in FIG. 4, taken generally on line B-B of FIG. 4.
Figure 4:
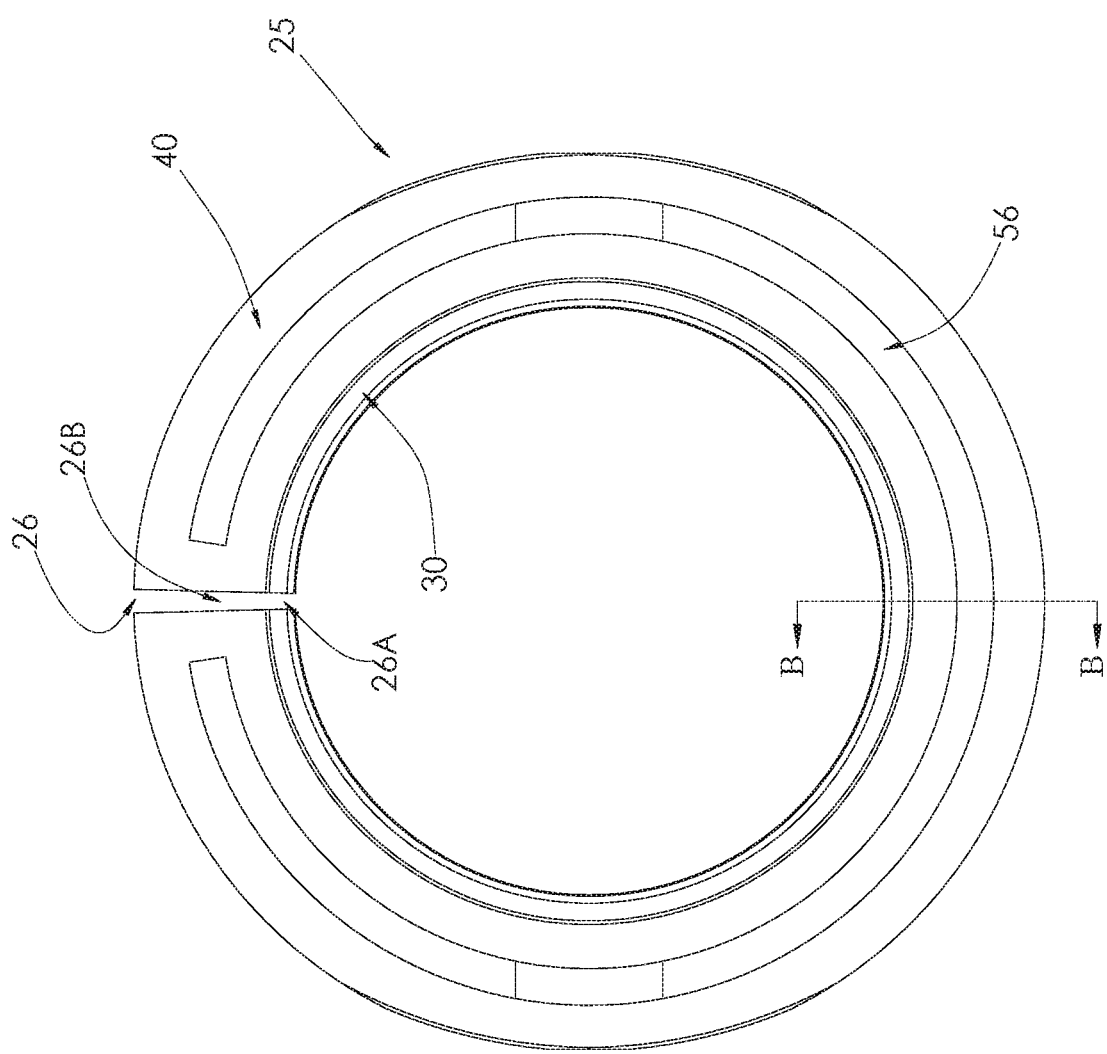
FIG. 4 is an enlarged end view of one of the two end gaskets shown in FIG. 3.

As shown in FIGS. 5 and 7, outer split-ring gasket layer 40 includes pressure assist cavity 56 to aid in sealing to pipe 19 or 119 under compressive pressure.

Turning now to FIGS. 10-21, a pipe coupling assembly 115 according to a second example embodiment is shown. Coupling assembly 115 has a number of the features of assembly 15 described above in connection with FIGS. 1-9. The significant difference between coupling assembly 115 and assembly 15 are the features of assembly 115 that limit rotational movement of gasket layers 130 and 140 relative to each other about axis x-x.

Referring now FIGS. 10-21, assembly 115 generally comprises outer encapsulation sleeve or shell 16 and end gaskets 125 and 125A, which surround pipe 19 having outer diameter 20. As with assembly 15, shell 16, gaskets 125 and 125A and pipe 19 are all generally ring-like cylindrical structures orientated about axis x-x.

Sleeve 16 of assembly 115 is substantially the same as sleeve 16 of assembly 15, having a semi-cylindrical top half shell 16A and semi-cylindrical lower half shell 16B, which are bolted together via bolts 28A and nuts 28B. End gaskets 125 and 125A are configured to wrap around and encircle pipe 19 between outer surface 22 of pipe 19 and specially configured inner pockets 21 and 21A of the two halves 16A and 16B, respectively, of encapsulating sleeve 16 to form a seal, with end gaskets 125A and 125B sealing on pipe 19 having outer diameter 20. Each of pockets 21 and 21A of the two halves 16A and 16B are semi-cylindrical inner open-faced channels configured to axially-retain outer gasket 140.

End gaskets 125 and 125A have specially contoured features and are disposed generally between the inner surfaces of sleeve 16 and outer cylindrical surface 22 of pipe 16. Thus, end gaskets 125 and 125A are sandwiched between the inside semi-cylindrical surfaces of sleeve 16 and outside cylindrical surface 22 of conduit 19 to provide sufficient sealing force to prevent leakage of fluid. Elastic or sealing energy is imparted into assembly 115 by tightening sleeve 16 from a loosened or a non-actuated position to a tightened sealed position.

As shown, each of end gaskets 125 and 125A comprises two nested gasket split-ring layers 130, 140 that can be separated from each other. Each end gasket 125 and 125A comprises outer gasket split-ring 140 and removable inner gasket split-ring 130. Inner split-ring or layer 130 may be removed from outer split-ring or layer 140.

Figure 16:
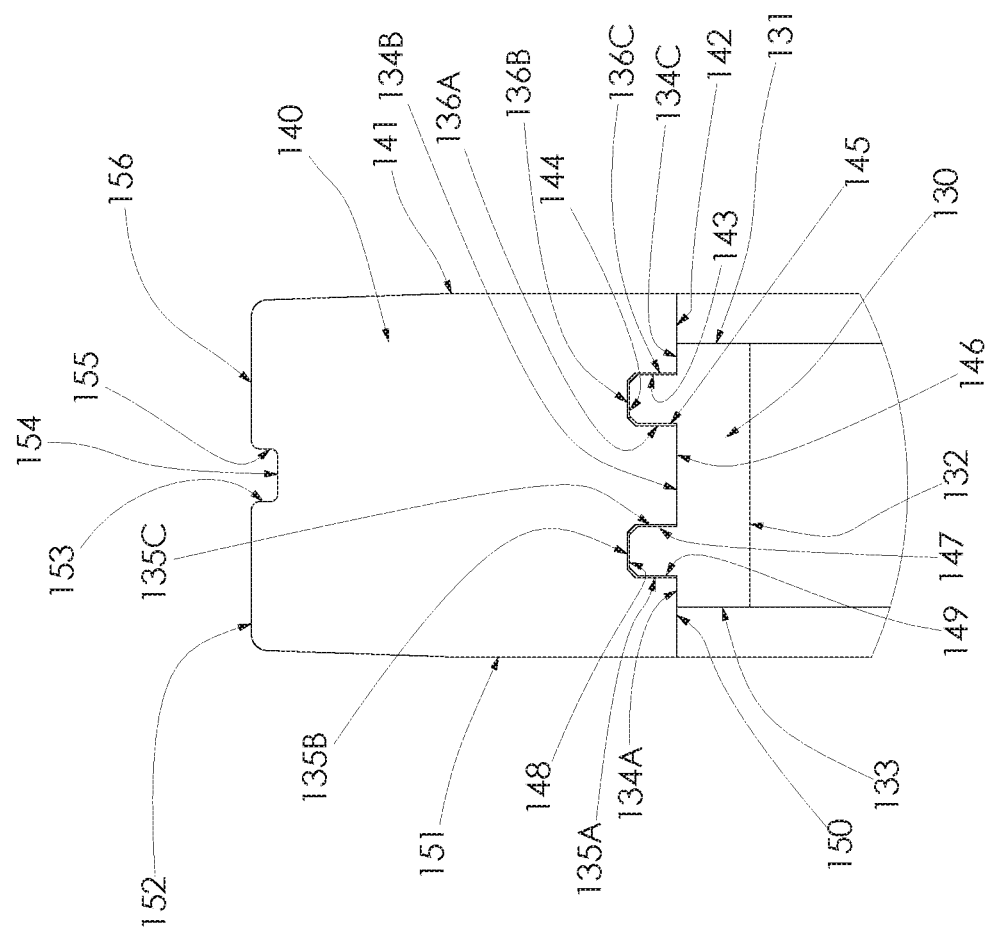
FIG. 16 is an enlarged longitudinal vertical cross-sectional view of the end gasket shown in FIG. 15, taken generally within the indicated circle H of FIG. 15.
Figure 18:
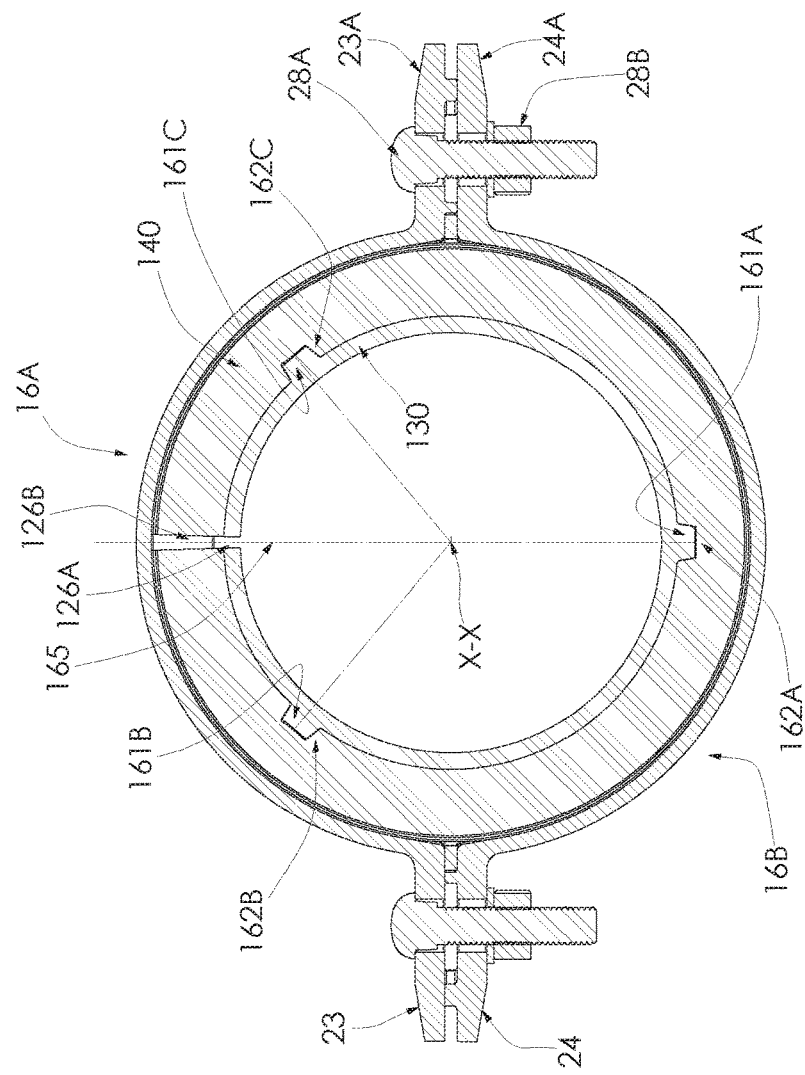
FIG. 18 is an enlarged transverse vertical cross-sectional view of assembly shown in FIG. 17, taken generally on line I-I of FIG. 17.
Figure 17:
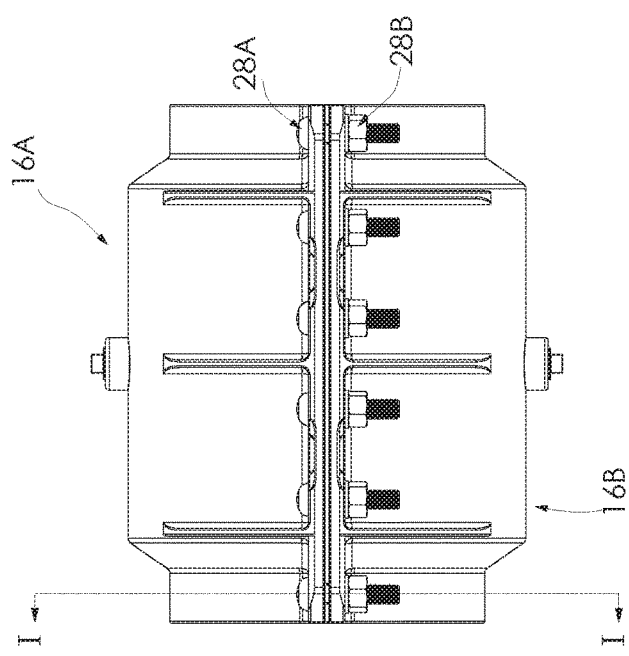
FIG. 17 is a side view of the assembly shown in FIG. 10.
Figure 19:
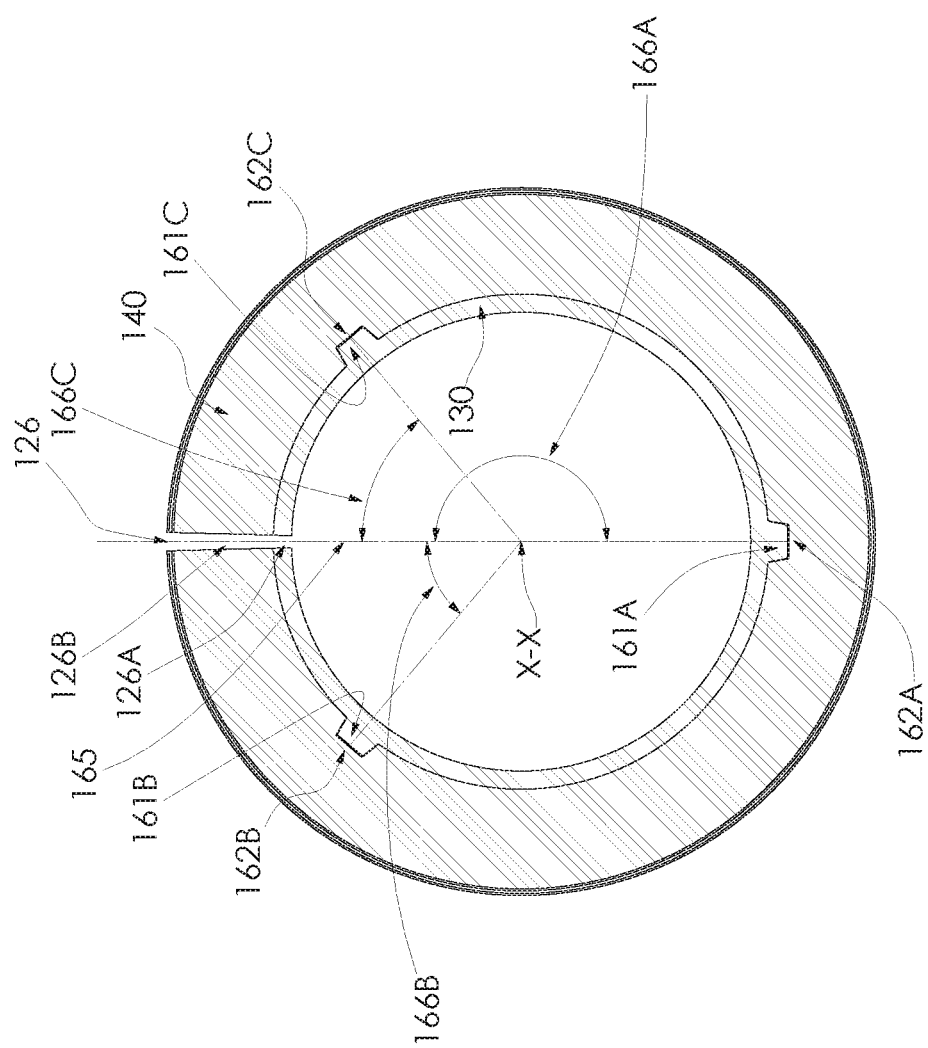
FIG. 19 is a cross-sectional view of the end gasket shown in FIG. 18.

As shown in FIG. 16, outer split ring gasket 140 is a specially-configured ring-shaped solid penannular member elongated along axis x-x, and is generally bounded by rightwardly-facing vertical annular surface 141, inwardly-facing horizontal cylindrical surface 142, leftwardly-facing vertical annular surface 143, inwardly-facing horizontal cylindrical surface 144, rightwardly-facing vertical annular surface 145, inwardly-facing horizontal cylindrical surface 146, leftwardly-facing vertical annular surface 147, inwardly-facing horizontal cylindrical surface 148, rightwardly-facing vertical annular surface 149, inwardly-facing horizontal cylindrical surface 150, leftwardly-facing vertical annular surface 151, outwardly-facing horizontal cylindrical surface 152, rightwardly-facing vertical annular surface 153, outwardly-facing horizontal cylindrical surface 154, leftwardly-facing vertical annular surface 155, and outwardly-facing horizontal cylindrical surface 156, joined at its right marginal end to the outer marginal end of surface 141. Surfaces 147, 148 and 149 define first annular channel 157A in the inner circumference surfaces 142 and 150 of outer gasket 140, and surfaces 143, 144 and 145 define second annular channel 157B in the inner circumference surfaces 142 and 150 of outer gasket 140.

As shown, outer circumferential surface 152, 155 includes annular groove 160 defined by rightwardly-facing vertical annular surface 153, outwardly-facing horizontal cylindrical surface 154 and leftwardly-facing vertical annular surface 155. As shown, groove 160 extends into the outer circumferential surface of outer gasket 140 in a plane substantially perpendicular to axis x-x. Groove 160 provides volumetric space for gasket 140 to move into as sleeve 16 is tightened to pipe 19 and gasket 125 is radially compressed between shell 116 and pipe 19, facilitating an improved seal.

Figure 20:
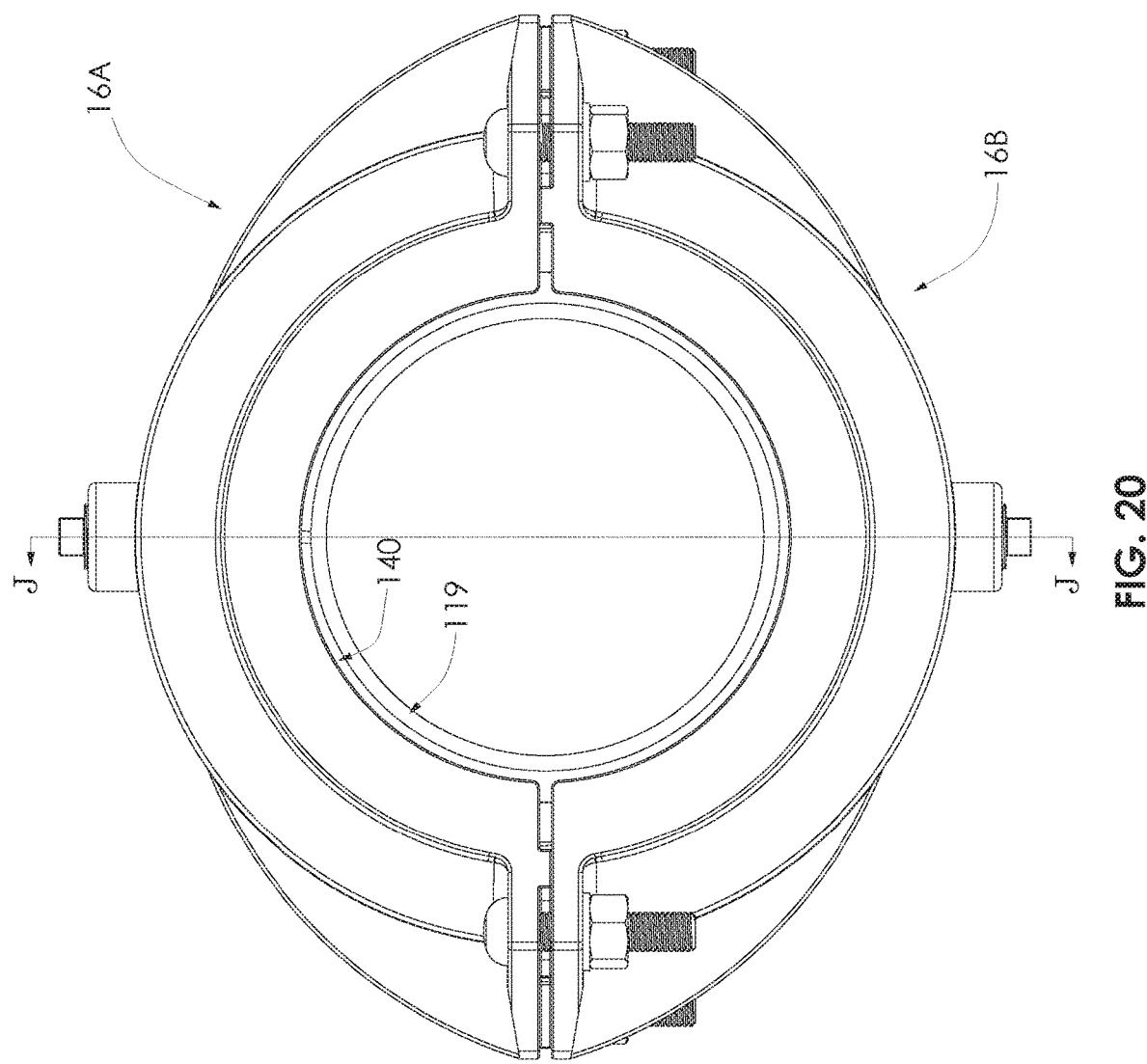
FIG. 20 is an end view of the assembly shown in FIG. 10 installed on an oversized diameter pipe.
Figure 21:
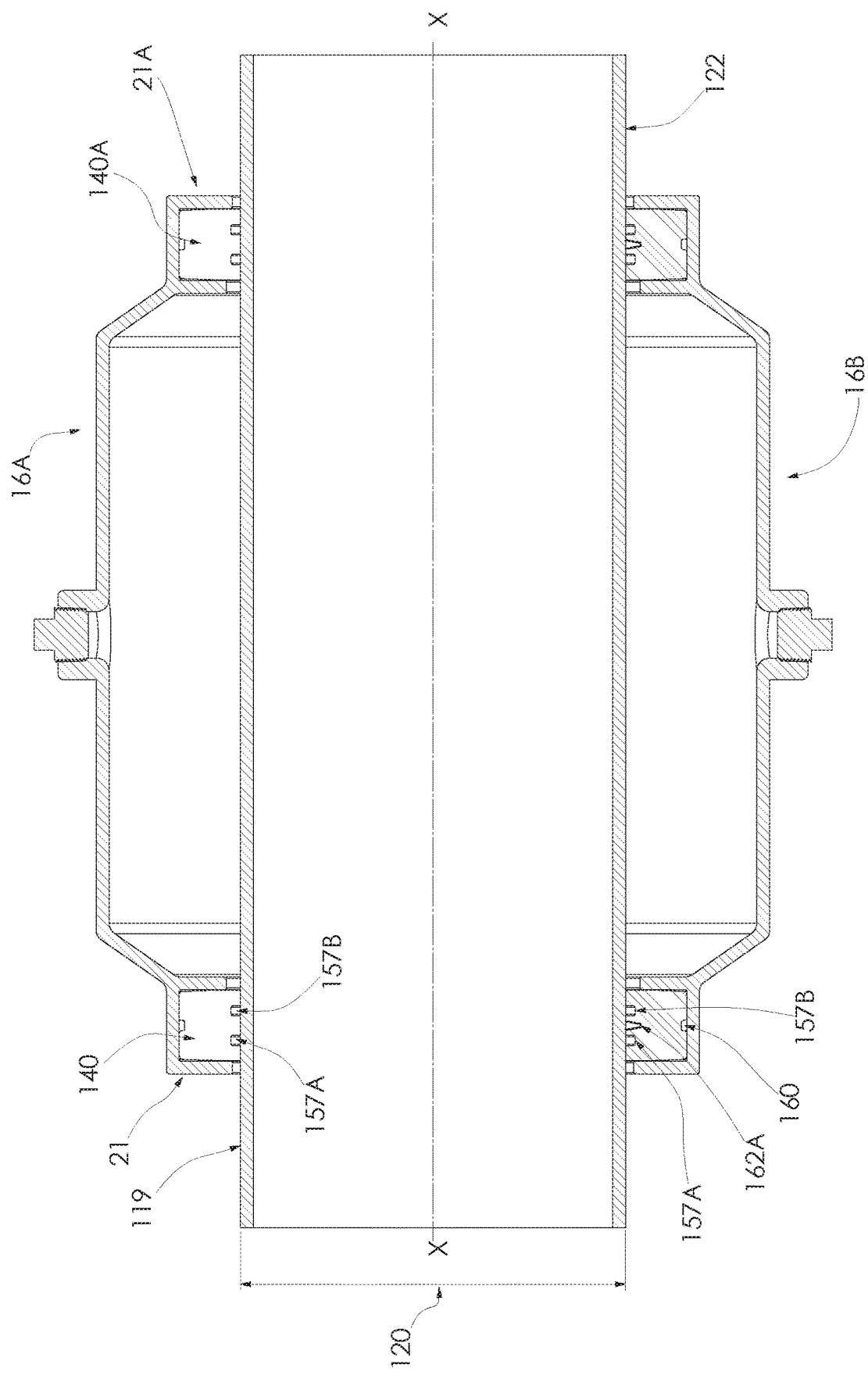
FIG. 21 is a longitudinal vertical cross-sectional view of the assembly shown in FIG. 20, taken generally on line J-J of FIG. 20.

As shown in FIG. 16, inner split ring gasket 130 is a specially-configured ring-shaped solid penannular member elongated along axis x-x, and is generally bounded by rightwardly-facing vertical annular surface 131, inwardly-facing horizontal cylindrical surface 132, leftwardly-facing vertical annular surface 133, outwardly-facing horizontal cylindrical surface 134A, leftwardly-facing vertical annular surface 135A, outwardly-facing horizontal cylindrical surface 135B, rightwardly-facing vertical annular surface 135C, outwardly-facing horizontal cylindrical surface 134B, leftwardly-facing vertical annular surface 136A, outwardly-facing horizontal cylindrical surface 136B, rightwardly-facing vertical annular surface 136C, and outwardly-facing horizontal cylindrical surface 134C, joined at its right marginal end to the outer marginal end of surface 131. Surfaces 135A, 135B and 135C define spline 139A extending outwardly from outer circumferential surface 134A, 134B and 134C of inner gasket 130, and surfaces 136A, 136B and 136C define spline 139B extending outwardly from outer circumferential surface 134A, 134B and 1345C of inner gasket 130. Splines 139A and 139B of inner gasket 130 are orientated in a plane substantially perpendicular to axis x-x and mate with channels 157A and 157B of outer gasket 140, respectively. As shown, inner gasket layer 130 has axial width 127A between side surfaces 131 and 133 that is less than axial width 127B between side surfaces 141 and 151 of outer gasket layer 140. Inner gasket split-ring 130 is manually removable from outer gasket split-ring 140 to allow end gaskets 125 and 125A to be installed on oversize pipe 119 having outer diameter 120, as shown in FIGS. 20 and 21.

Split-ring end gaskets 125 and 125A are formed of a resilient material and are cut radially so as to be penannular and not form a full ring. Thus, instead of being a full continuous annular ring, radial break or gap 126 is provided through each layer 130 and 140 at a circumferential location. Thus, each layer 130 and 140 has radial split 126A and 126B, respectively, through the entire gasket cross-section. The edges of gap 126 may thereby be manually separated or pulled apart from each other to form a more open C-shaped member. This gap is increased such that it is greater than outer diameter 20 of pipe 19 so that end gaskets 125 and 125A can be installed on or fit around outer diameter 20 of pipe 19. Once installed on pipe 19, the opposed ends of the split-rings 130 and 140 will move back towards each other and gap 126 will close up.

Inner split-ring 130 and outer split-ring 140 are loosely connected to each other via annular splines 139A and 139B of inner gasket 130 being nested in annular channels 157A and 157B, respectively, such that inner split-ring 130 is adapted to be removed from outer split-ring 140 at a predetermined location. This allows end gasket 125 to be used with pipes of substantially different diameters. Thus, for pipe 19 having smaller outer diameter 20, inner and outer split-rings 130 and 140 are nested and used together, as shown in FIGS. 10-16. For pipes 119 of greater outer diameter 120, inner split-ring 130 is manually separated from outer split-ring 140 and just outer split-ring 140 is used as the end gasket, as shown in FIGS. 20 and 21. Accordingly, gaskets 125 and 125A each include penannular outer gasket layer 140 and separate penannular inner gasket layer 130 that is insertable into and removable from outer gasket layer 140. Gaskets 125 and 125A define a gasket opening orientated about longitudinal axis x-x.

As shown in FIGS. 14, 15, 18 and 19, inner gasket layer 130 includes three circumferentially spaced radially extending protrusions 161A, 161B and 161C interfacing with correspondingly circumferentially spaced radially inwardly extending cavities 162A, 162B and 162C in outer gasket layer 140. Protrusions 161A, 161B and 161C of gasket layer 130 mate with cavities 162A, 162B and 162C in outer gasket layer 140 to retain gasket layers 130 and 140 in rotational and angular alignment about longitudinal axis x-x. When nested, protrusions 161A, 161B and 161C of gasket layer 130, mated with cavities 162A, 162B and 162C of gasket layer 140, prevent rotational movement of gasket layers 130 and 140 relative to each other about axis x-x such that radial splits 126A and 126B are aligned on common radius 165 about axis x-x.

Figure 12:
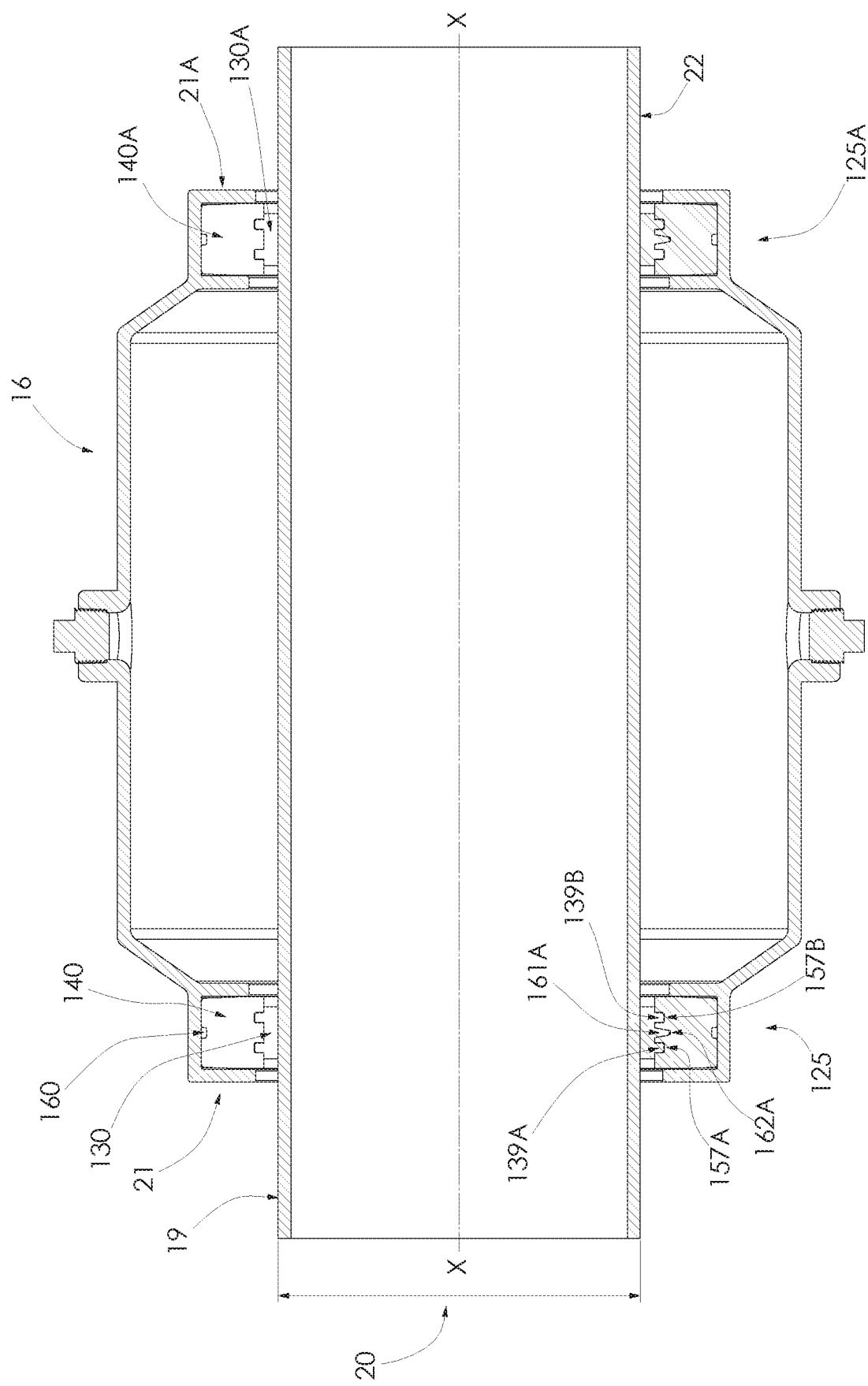
FIG. 12 is a longitudinal vertical cross-sectional view of the assembly shown in FIG. 11, taken generally on line E-E of FIG. 11.
Figure 15:
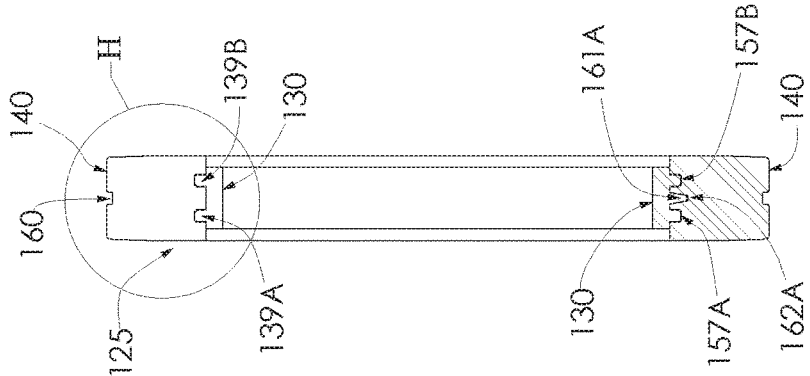
FIG. 15 is a longitudinal vertical cross-sectional view of the end gasket shown in FIG. 13, taken generally on line G-G of FIG. 13.
Figure 14:
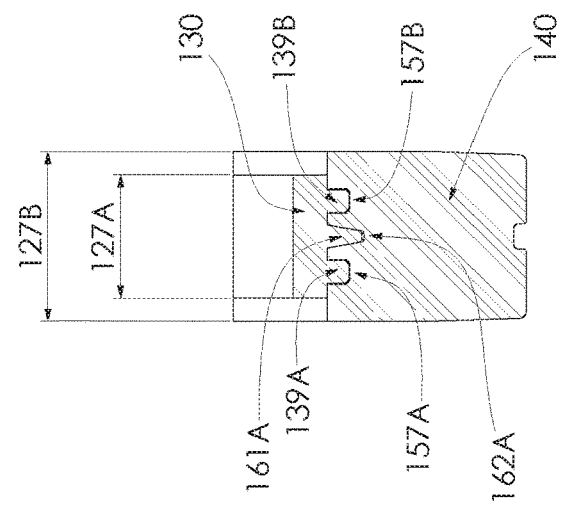
FIG. 14 is an enlarged longitudinal vertical cross-sectional view of the end gasket shown in FIG. 13, taken generally on line F-F of FIG. 13.
Figure 13:
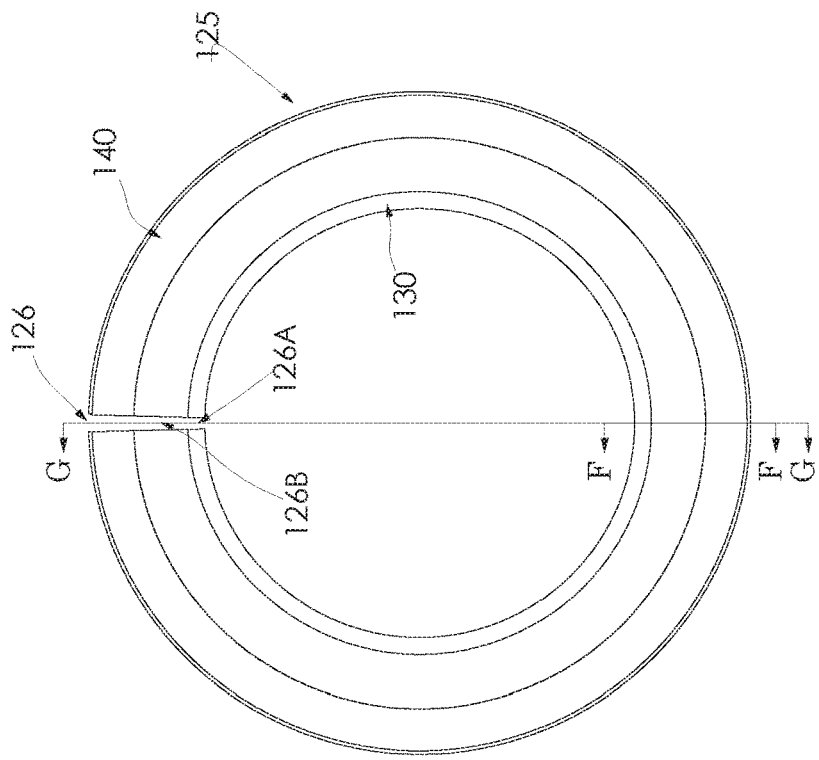
FIG. 13 is an enlarged end view of one of the two end gaskets shown in FIG. 12.

Outer gasket layer 140 is configured to nest in annular pocket 21 of shell 16 along outer circumferential surfaces 152, 156 and has inner circumferential surfaces 142, 146 and 150 configured to engage either inner gasket layer 130, as shown in FIG. 12, or outer surface 122 of pipe 119 when inner gasket layer 130 is removed, as shown in FIG. 21. Inner gasket layer 130 is configured to nest in annular channels 157A and 157B and circumferentially spaced cavities 162A, 162B and 162C of outer gasket 140 via splines 139A and 139B and circumferentially spaced spokes 161A, 161B and 161C, respectively, and has inner circumferential surface 132 configured to engage outer surface 22 of pipe 19. Accordingly, inner gasket layer 130 may be readily removed from and reinserted into outer gasket layer 140. By positioning inner gasket layer 130 within outer gasket layer 140 with splines 139A and 139B and circumferentially spaced spokes 161A, 161B and 161C of inner gasket layer 130 aligned with annular channels 157A and 157B and circumferentially spaced cavities 162A, 162B and 162C of outer gasket 140, respectively, outer and inner gasket layers 130 and 140 are both held together by their own resiliency, although gasket layers 130 and 140 may be easily separated by pulling inner gasket layer 130 inwardly in a radial direction and then away from outer gasket layer 140, and rotationally or angularly aligned about axis x-x relative to each other via circumferentially spaced spokes 161A, 161B and 161C and cavities 162A, 162B and 162C.

As shown, outer gasket layer 140 includes outer circumferential surfaces 152 and 156 facing shell pocket 21 and inner circumferential surfaces 142, 146 and 150 facing inner gasket layer 130, or pipe 119 when inner gasket layer 130 is removed. The inner circumferential surfaces 142, 146 and 150 define a first opening having a first diameter 120, as shown in FIG. 21. Similarly, inner gasket layer 130 includes outer circumferential surfaces 134A, 134B and 134C facing outer gasket layer 140 and inner circumferential surface 132 facing pipe 19. Inner circumferential surface 132 defines a second opening having a second smaller diameter 20, as shown in FIG. 12.

Inner gasket layer 130 may be selectively disengaged from outer gasket layer 140 and removed from coupling assembly 115 to modify an effective range of pipe outer diameters that may be sealed by and accommodated within coupling assembly 115. Thus, removable inner gasket layer 130 enables modification of an effective diameter of coupling assembly 115. For example and without limitation, diameter 20 may allow coupling assembly 15 to receive a pipe or pipe end having an outer diameter (OD) in the range of about 6.55 inches to about 7.05 inches due to the presence of the inner gasket layer 130. However, removal of inner gasket layer 130 results in a second opening of diameter 120, which may allow, for example and without limitation, assembly 15 to thereby receive a pipe or pipe end having an OD in the range of about 7.04 inches to about 7.65 inches. However the diametrical dimensions and ranges of gaskets 125 and 125A may be modified in other embodiments for pipes of different size ranges.

In this embodiment, protrusions 161A, 161B and 161C of gasket layer 130 and cavities 162A, 162B and 162C of gasket layer 140 are circumferentially spaced about axis x-x, with protrusion 161A and cavity 162A angularly aligned 166A about 180° from radial gap 126, protrusion 161B and cavity 162B angularly aligned 166B about 45° from radial gap 126 on one side, and protrusion 161B and cavity 162B angularly aligned 166C about 45° from radial gap 126 on the other side. However, fewer or more retaining protrusions may be used and the spacing of such retaining elements about axis x-x may be varied. Furthermore, while in this embodiment the protrusions are provided on the outer circumferential surface of inner gasket 130 and corresponding cavities are provided on the inner circumferential surface of outer gasket 140, the cavities may be formed in the outer circumferential surface of inner gasket 130 and corresponding protrusions may be formed on the inner circumferential surface of outer gasket 140.

While inner circumferential surface 132 of inner gasket layer 130 is generally smooth in this embodiment, alternatively and without limitation it may be provided with ribs, projections, beads or grooves to provide an improved sealing connection with pipe 19. While outer circumferential surface 152, 156 of outer gasket layer 140 is formed with annular channel 160, alternatively and without limitation additional channels or grooves of alternative cross-sectional profiles may be employed for improved gasket compression and sealing. Furthermore, channel 160 may have a non-uniform width around the gasket circumference or may comprise multiple channels that each extends less than 180° of the outer circumference of the gasket when in place.

The present invention contemplates that many changes and modifications may be made. Therefore, while forms of the improved coupling assembly has been shown and described, and a number of alternatives discussed, persons skilled in this art will readily appreciate that various additional changes and modifications may be made without departing from the scope of the invention, as defined and differentiated by the claims.

What is claimed is:
1. A conduit coupling assembly configured to clamp to a fluid conduit oriented about a longitudinal axis comprising:
   a first arcuate sleeve member;
   a second arcuate sleeve member;
   a connecting assembly coupling the first sleeve member to the second sleeve member and configured to tighten said first and second sleeve members to a fluid conduit from a non-actuated position to a tightened position;

an arcuate radial-split gasket configured to be positioned between said first and second sleeve members and said fluid conduit;

said gasket comprising a radial-split arcuate resilient outer gasket layer configured to provide a seal under compression and a separate radial-split arcuate resilient inner gasket layer configured to provide a seal under compression;

said outer gasket layer having a resilient inner circumferential surface and a resilient outer circumferential surface;

said inner gasket layer having a resilient inner circumferential surface and a resilient outer circumferential surface;

said inner and outer gasket layers configured to be selectively disengaged from each other; and at least one of said inner circumferential surface of said outer gasket layer or said outer circumferential surface of said inner gasket layer comprising a plurality of separate circumferentially spaced apart resilient retaining protrusions radially interfacing between said inner and outer gasket layers at different circumferential locations about said longitudinal axis;

at least one of said inner circumferential surface of said outer gasket layer or said outer circumferential surface of said inner gasket layer comprising a plurality of separate circumferentially spaced apart retaining cavities in said outer gasket layer or said inner gasket layer at different circumferential locations about said longitudinal axis that are correspondingly located about said longitudinal axis to said retaining protrusions; and said plurality of separate circumferentially spaced apart retaining protrusions radially interfacing between said inner and outer gasket layers at different circumferential locations about said longitudinal axis received within said plurality of separate circumferentially spaced apart retaining cavities in the other of said outer gasket layer or said inner gasket layer that are correspondingly located about said longitudinal axis to said retaining protrusions;

whereby said plurality of separate circumferentially spaced apart retaining protrusions and said plurality of separate circumferentially spaced apart retaining cavities are configured to maintain angular alignment of said inner and outer gasket layers about said longitudinal axis.

2. The coupling assembly set forth in claim 1, wherein said plurality of separate circumferentially spaced apart retaining protrusions comprise said outer circumferential surface of said inner gasket layer having a plurality of radially protruding circumferentially spaced spokes interfacing with said outer gasket layer to maintain said angular alignment of said inner and outer gasket layers about said longitudinal axis.

3. The coupling assembly set forth in claim 2, wherein said plurality of separate circumferentially spaced apart retaining cavities comprise said inner circumferential surface of said outer gasket layer having a plurality of circumferentially spaced cavities configured to receive said protruding circumferentially spaced spokes of said inner gasket layer to maintain said angular alignment of said outer gasket layer and said inner gasket layer about said longitudinal axis.

4. The coupling assembly set forth in claim 3, wherein said circumferentially spaced spokes of said inner gasket layer and said circumferentially spaced cavities of said outer gasket layer are correspondingly located about said longitudinal axis and are in mating engagement to maintain said angular alignment of said inner and outer gasket layers about said longitudinal axis such that said radial-split of said outer gasket layer and said radial split of said inner gasket layer are aligned on a common radius about said longitudinal axis.

5. The coupling assembly set forth in claim 1, wherein said outer circumferential surface of said outer gasket layer comprises an inwardly extending circumferential groove therein.

6. The coupling assembly set forth in claim 5, wherein said circumferential groove has a circumferential arc length about said longitudinal axis substantially less than said outer circumferential surface of said outer gasket layer about said longitudinal axis.

7. The coupling assembly set forth in claim 1, wherein said outer gasket layer has a maximum axial width and said inner gasket layer has a maximum axial width less than said maximum axial width of said outer gasket layer.

8. The coupling assembly set forth in claim 1, wherein:
said inner circumferential surface of said outer gasket layer comprises a plurality of inwardly extending circumferential channels therein;
said outer circumferential surface of said inner gasket layer comprises a plurality of outwardly extending circumferential splines; and
said circumferential channels of said outer gasket layer configured to receive said circumferential splines of said inner gasket layer.

9. A gasket comprising:
a radial-split arcuate resilient outer gasket layer and a separate radial-split arcuate resilient inner gasket layer orientated about a common longitudinal axis;
said outer gasket layer configured to provide a seal under compression and having a resilient inner circumferential surface and a resilient outer circumferential surface;
said inner gasket layer configured to provide a seal under compression and having a resilient inner circumferential surface and a resilient outer circumferential surface;
said inner and outer gasket layers configured to be selectively disengaged from each other; and
at least one of said inner circumferential surface of said outer gasket layer or said outer circumferential surface of said inner gasket layer comprising a plurality of separate circumferentially spaced apart resilient retaining protrusions radially interfacing between said inner and outer gasket layers at different circumferential locations about said longitudinal axis;
at least one of said inner circumferential surface of said outer gasket layer or said outer circumferential surface of said inner gasket layer comprising a plurality of separate circumferentially spaced apart retaining cavities in said outer gasket layer or said inner gasket layer at different circumferential locations about said longitudinal axis that are correspondingly located about said longitudinal axis to said retaining protrusions; and
said plurality of separate circumferentially spaced apart retaining protrusions radially interfacing between said inner and outer gasket layers at different circumferential locations about said longitudinal axis received within said plurality of separate circumferentially spaced apart retaining cavities in the other of said outer gasket layer or said inner gasket layer that are correspondingly located about said longitudinal axis to said retaining protrusions;
whereby said plurality of separate circumferentially spaced apart retaining protrusions and said plurality of separate circumferentially spaced apart retaining cavities are configured to maintain angular alignment of said inner and outer gasket layers about said longitudinal axis.

10. The gasket set forth in claim 9, wherein said plurality of separate circumferentially spaced apart retaining protrusions comprise said outer circumferential surface of said inner gasket layer having a plurality of radially protruding circumferentially spaced spokes interfacing with said outer gasket layer to maintain said angular alignment of said inner and outer gasket layers about said longitudinal axis.

11. The gasket set forth in claim 10, wherein said plurality of separate circumferentially spaced apart retaining cavities comprise said inner circumferential surface of said outer gasket layer having a plurality of circumferentially spaced cavities configured to receive said protruding circumferentially spaced spokes of said inner gasket layer to maintain said angular alignment of said outer gasket layer and said inner gasket layer about said longitudinal axis.

12. The gasket set forth in claim 11, wherein said circumferentially spaced spokes of said inner gasket layer and said circumferentially spaced cavities of said outer gasket layer are correspondingly located about said longitudinal axis and are in mating engagement to maintain said angular alignment of said inner and outer gasket layers about said longitudinal axis such that said radial-split of said outer gasket layer and said radial split of said inner gasket layer are aligned on a common radius about said longitudinal axis.

13. The gasket set forth in claim 9, wherein said outer circumferential surface of said outer gasket layer comprises an inwardly extending circumferential groove therein.

14. The gasket set forth in claim 13, wherein said circumferential groove has a circumferential arc length about said longitudinal axis substantially less than said outer circumferential surface of said outer gasket layer about said longitudinal axis.

15. The gasket set forth in claim 9, wherein:
said inner circumferential surface of said outer gasket layer comprises a plurality of inwardly extending circumferential channels therein;
said outer circumferential surface of said inner gasket layer comprises a plurality of outwardly extending circumferential splines; and
said circumferential channels of said outer gasket layer are configured to receive said circumferential splines of said inner gasket layer.

16. The gasket set forth in claim 9, wherein said outer gasket layer has a maximum axial width and said inner gasket layer has a maximum axial width less than said maximum axial width of said outer gasket layer.

\* \* \* \* \*